United States Patent

[11] 3,633,038

| [72] | Inventor | Mervin L. Falk<br>Sunnyvale, Calif. |
| --- | --- | --- |
| [21] | Appl. No. | 33,689 |
| [22] | Filed | May 1, 1970 |
| [45] | Patented | Jan. 4, 1972 |
| [73] | Assignee | Newell Industries<br>Sunnyvale, Calif. |

[54] TRANSDUCER-POSITIONING SYSTEM USING RADIATION-SENSITIVE MEANS
5 Claims, 4 Drawing Figs.

[52] U.S. Cl. ................................................. 250/231 R,
250/220 R, 250/237 G, 340/174.1 R
[51] Int. Cl. ....................................................... G01d 5/34
[50] Field of Search ............................................. 250/231,
237, 237 G, 219 F, 220 R; 340/174.1 R; 356/170

[56] References Cited
UNITED STATES PATENTS

| 2,945,959 | 7/1960 | Atkinson | 250/239 X |
| 3,114,046 | 12/1963 | Cabaniss et al. | 250/237 |
| 3,427,463 | 2/1969 | Weyrauch | 250/237 |
| 3,360,660 | 12/1967 | Kusch et al. | 250/231 X |

Primary Examiner—Walter Stolwein
Attorney—Flehr, Hohbach, Test, Albritton & Herbert ABSTRACT: A transducer-positioning system for registering a signal transducer with respect to each of a plurality of laterally adjacent record paths. Optical averaging of a large number of position-sensible signals is employed to position the transducer in a centered position relative to each particular track.

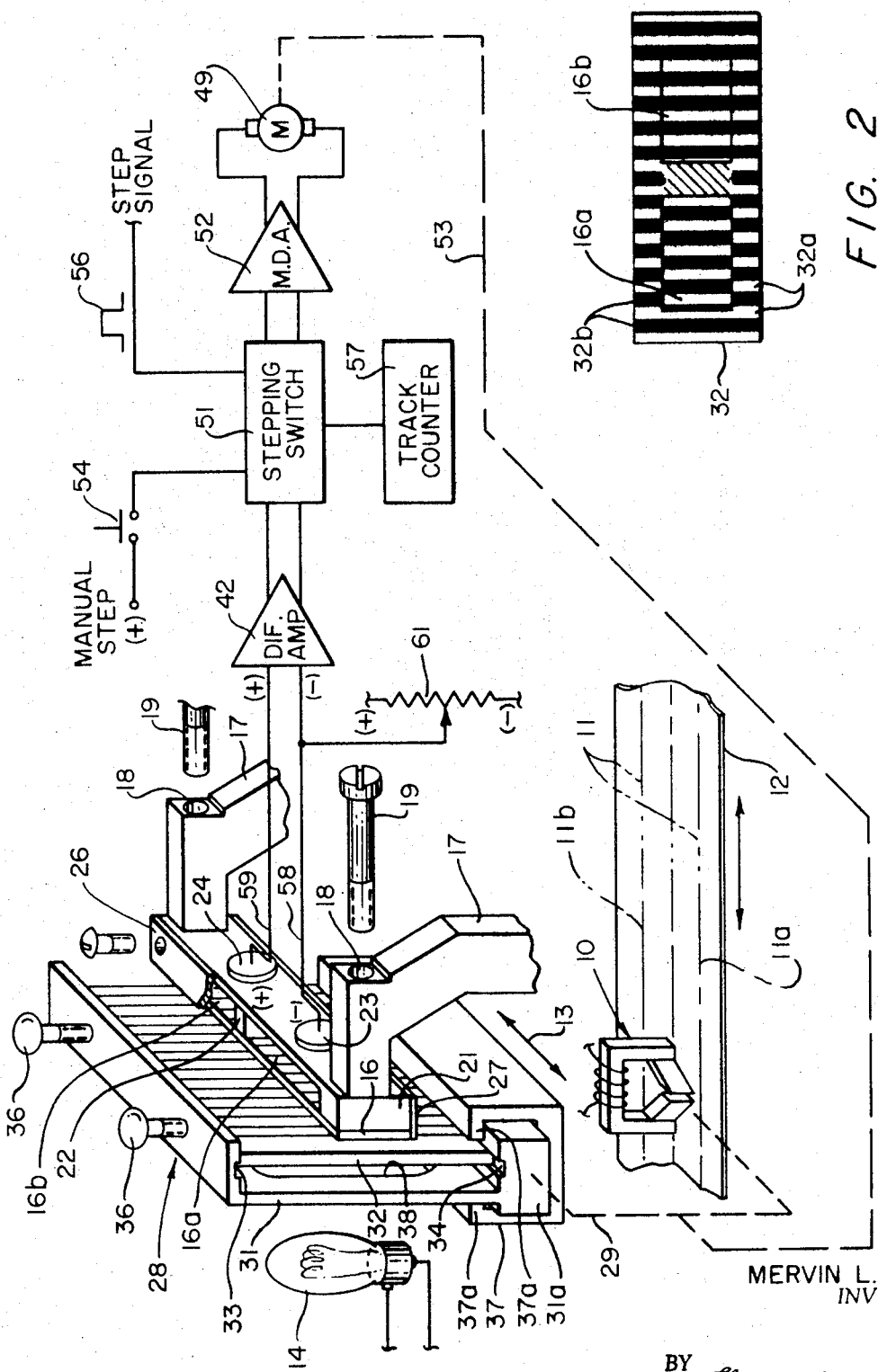

3,633,038

TRANSDUCER-POSITIONING SYSTEM USING RADIATION-SENSITIVE MEANS

BACKGROUND OF THE INVENTION

This invention pertains to a positioning system for accurately mechanically positioning an element, and is particularly useful in positioning a recording transducer in registration with respect to each of a number of laterally adjacent record paths defined upon a record medium, such as a magnetic recording tape, disc, or drum.

Heretofore, transducer-positioning systems have been provided wherein the recording transducer is mechanically positioned in registration with recording tracks of recording media. However, it is the essence of a satisfactory system of this type to be highly accurate and particularly with respect to accurate repeatable performance in relocating the transducer to the center of a track previously scanned by the transducer.

Accuracy in the mechanical positioning of a recording transducer has typically been difficult to achieve due to imperfections in workmanship of a type such as can serve to introduce undersired clearances and tolerances in the parts.

Optical means for more closely locating transducers relative to a number of recording tracks have been employed but, typically, have also been subject to the above criticism.

SUMMARY OF THE INVENTION AND OBJECTS

In general, there is provided herein a positioning system of a type for registering a signal transducer with respect to each of a plurality of laterally adjacent record paths defined upon a record medium, the system being characterized by means for effecting an optical averaging of a large number of position-sensible signals generated by positioning of the transducer and from which the transducer is centered relative to each particular recording path or track.

In general, it is an object to provide an improved transducer-positioning system.

Heretofore, in positioning systems relying upon optical accuracy in the alignment of each of a pair of optical windows, slight inaccuracies found in one or more of the windows to be aligned could serve to cause the transducer or other device to be poorly positioned relative to its intended track position.

It is, therefore, another object of the present invention to provide a positioning system of a type for registering a signal transducer while employing optical registration means wherein inaccuracy in the manufacture of a portion of the registration means will be optically distributed over a wide range of positions to which the transducer is intended to be moved.

In this way, the effects of inaccuracies in the manufacture of optical registration portions of the equipment is minimized or virtually eliminated.

Other objects of the invention will become more readily apparent from the following description of a preferred embodiment when considered in conjunction with the drawings.

BRIEF DESCRIPTION OF THE DRAWINGS

FIG. 1 is a diagrammatic view partially in perspective and partially in block diagram form showing a transducer-positioning system, according to the invention;

FIG. 2 is a diagram looking through the registration grids to aid in explanation of the structure of FIG. 1;

DETAILED DESCRIPTION OF A PREFERRED EMBODIMENT

Figure 4:
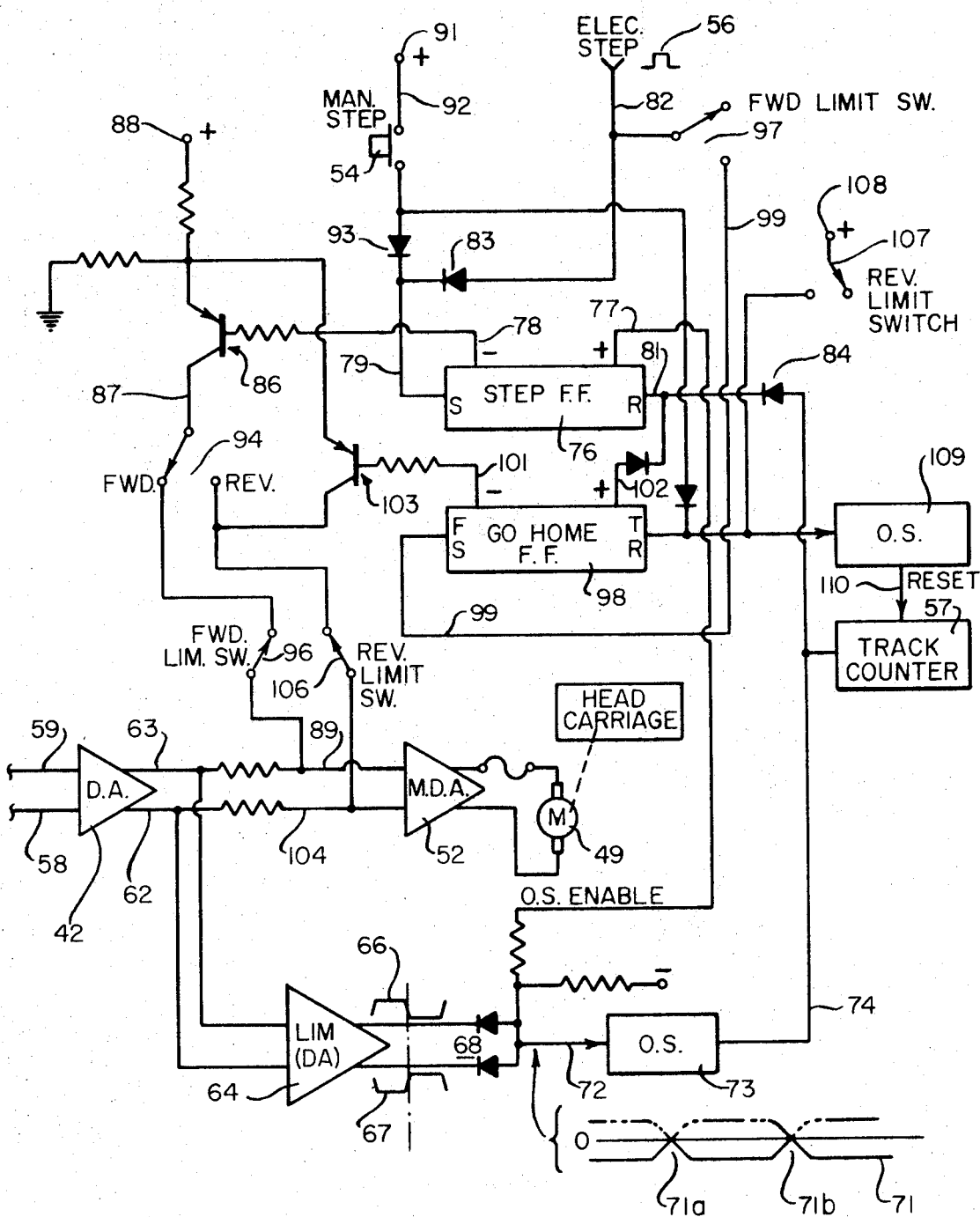
FIG. 4 is a schematic electronic diagram showing a system according to the invention.

The transducer-positioning system, as shown in detail in FIG. 4, is generally presented in FIG. 1 as now to be described.

A magnetic recording transducer 10 is schematically shown in FIG. 1 for cooperating with any one of a number of magnetic recording tracks 11 defined along a moving magnetic recording medium such as the recording tape 12. Tracks 11 are, accordingly, shown in phantom lines since they are generally not visible for inspection except under special circumstances.

Thus, arrow 13 represents the lateral movement of transducer 10 transversely of the direction of movement of tape 12. For ease in explanation, the convention has been used herein that where transducer 10 is to be moved to the far edge of tape 12 as shown in FIG. 1 such movement will be considered as forward movement and movement in an opposite direction will be referred to as reverse movement. Track 11a shall also be considered as the home track position and track 11b shall be considered the outermost track. It is to be understood that a relatively large number of tracks on the order of 30 to 40 tracks can be defined in side-by-side relation along tape 12 and that the several tracks shown in the figure are merely indicative of the general orientation of all such tracks.

In the system as now to be described, the signal transducer 10 can be positioned into registration with respect to each of a number of laterally adjacent record paths 11. First and second mask means having discrete, spaced transmissive portions respectively serving to subdivide light projected along each of two light paths supplies light respectively to each of two photoresponsive devices in a manner whereby the photoresponsive devices are influenced by the aggregate light passing simultaneously through a large number of the transmissive portions of an associated one of the mask means so as to provide a signal representation indicative of the aggregate light falling upon the photoresponsive means.

In addition, shutter means are arranged to be carried by transducer 10 for progressively increasing the light transmitted via one of the two mask means while commensurately reducing the light transmitted via the other mask means in response to movement of transducer 10 so as to provide oppositely varying signal representations from the first and second photoresponsive devices. The electronic system shown in block diagram form and explained in detail further below serves to move transducer 10 in response to a difference existing between the signal representations taken from each of the two photoresponsive devices 23, 24.

Accordingly, the first and second mask means each includes a grating 16 subdivided into a pair of laterally disposed portions 16a and 16b. Each of the two portions 16a, 16b are comprised of alternately occurring transmissive and opaque portions shown respectively in unshaded and shaded lines in the drawings.

Grating 16 is preferably formed by photographic processes well known whereby the alternately occurring vertical stripes as shown in FIG. 2 are applied to a glass or other transparent substrate by suitable techniques such as photoetching or the like. The width of the transmissive and opaque portions runs on the order of 0.012 inch to correspond to the width of one of tracks 11, plus suitable guard band.

Means for holding grating 16 in a stationary position relative to the frame of the machine comprises the two upwardly disposed support arms 17 formed at their upper ends with a hollow bore 18 adapted to receive one of screws 19 which slide freely along bore 18 until engaging corresponding threaded holes formed in support bracket 21. Bracket 21 is subdivided into two sections by means of the light barrier 22. Bracket 21 further carries a pair of photoresponsive devices such as photoelectric cells 23, 24 for registering the aggregate amount of light passing through its associated grating portions 16a, 16b respectively. Grating 16 is secured in readily removable style across the front of bracket 21, as by means of flathead screws disposed in countersunk holes in the face of grating 16.

The active face of photocells 23, 24 is disposed sufficiently spaced to the rear surface of grating portions 16a, 16b, respectively, whereby the angle of acceptance of the photocell serves to subject the photocell to light passing through substantially all or a large number of the transmissive portions of its associated grating portion.

Light is sealed out of the top and bottom of the spaces between photocells 23, 24 and their respective grating portions 16a, 16b by means of the top and bottom closure members 26, 27.

A shutter assembly 28, mechanically coupled (as indicated by the dashed line 29) directly to transducer 10 is arranged to move transversely of the tracks 11 conjointly with movement of transducer 10. In addition, shutter assembly 28 cooperates to generate positioning signals as described further below.

Thus, shutter assembly 28 consists of a mounting frame 31 arranged for carrying a readily removable mask or grating 32. The upper and lower edges of grating 32 are held in slots 33, 34 respectively and firmly retained by a pair of thumbscrews 36 threaded downwardly into the interior portion of slot 33 so as to press against the edge of grating 32.

Means for guiding assembly 28 laterally consists of an elongated way 37 of a generally U-shaped construction provided with lips 37a overhanging the upper edge of an enlarged rectangular base portion 31a of frame member 31.

Frame member 31 includes an opening 38 through which light from light source 14 can pass.

Grating 32 is preferably of a transparent material, such as glass prepared with alternately occurring transmissive and opaque portions such as the stripes 32a, 32b (FIG. 2). The width of stripes 32a, 32b corresponds to the width of the alternately occurring transmissive and opaque portions of grating portions 16a, 16b. However, as shown in FIG. 2, when the opaque stripes of grating portions 16a are aligned with the transmissive portions 32a of grating 32 so as to entirely block the transmission of light along that side of shutter assembly 28, the transmissive portions of grating 16b will be aligned with transmissive portions of grating 32 for maximum transmission of light therethrough.

The stationary grating portions 16a, 16b are disposed sufficiently close to the surface of grating 32 whereby substantially all light will be blocked from reaching one or the other of the two photocells 23, 24 when the opaque portions are fully aligned with the transmissive portions.

From the foregoing it will be readily apparent that there is defined above a pair of light paths each characterized by the inclusion of one of the two photocells 23, 24 and grating portions 16a, 16b which serve to progressively block and pass light thereto.

Figure 3:
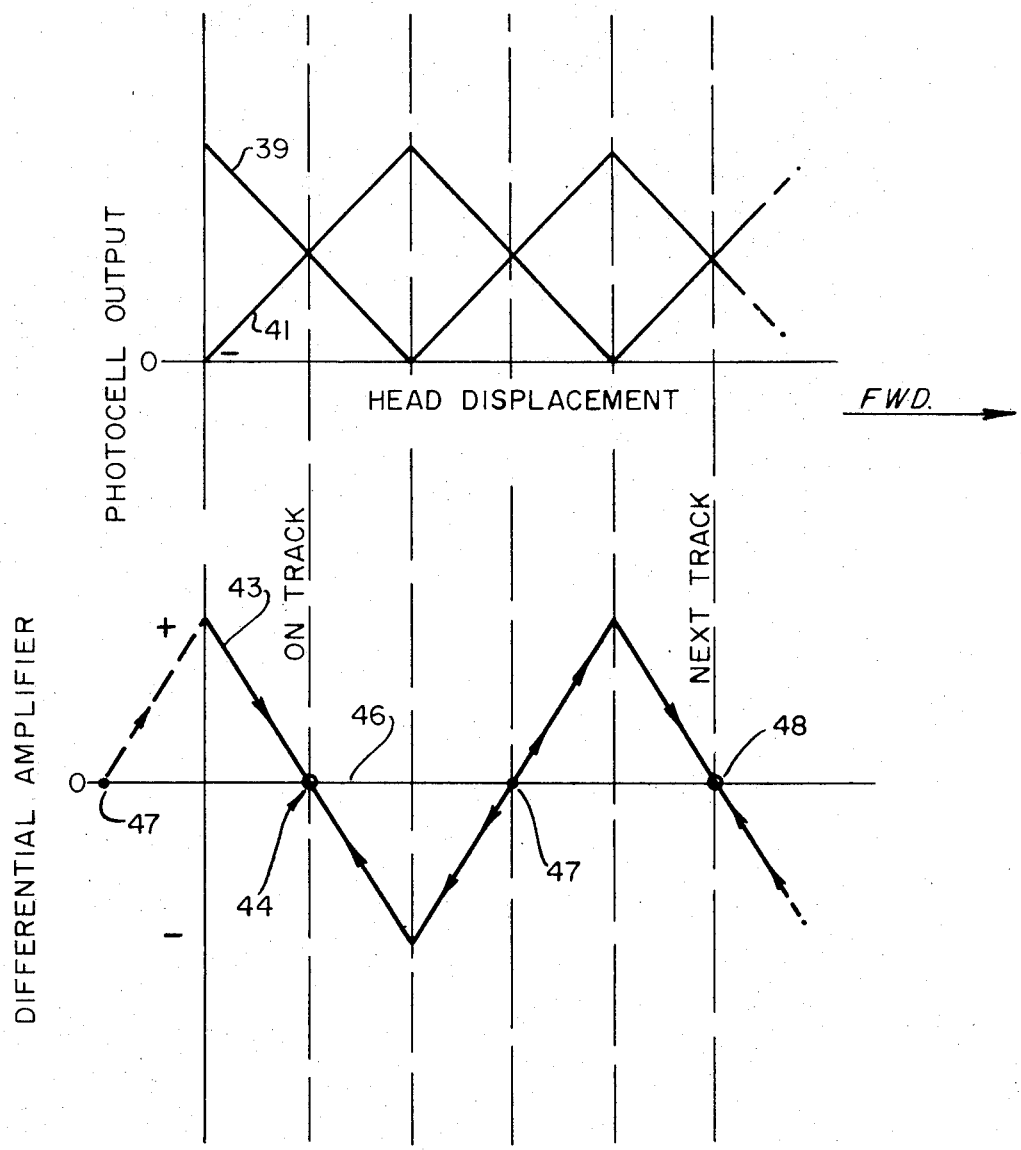
FIG. 3 shows a diagrammatic graphical plot of photocell output signals plotted relative to the output generated from a differential amplifier receiving the photocell outputs.

It will also be apparent that upon movement of shutter assembly 28 transversely of tape 12 light passing to one photocell will be gradually increasing while light passing to the other photocell will be gradually decreasing. This is represented in FIG. 3 by the traces 39, 41 respectively identified with photocells 24, 23. When shutter assembly 28 has moved halfway from one position to the next both photocells will produce the same output.

By feeding the output from each of the two photocells to a differential amplifier 42, it can be readily appreciated that an output trace 43 can be developed whereby at the time when both photocells register the same aggregate light value the amplifier 42 will produce a zero output, as at point 44.

At this point 44 it is to be understood that transducer 10 has been centered directly on the magnetic recording path 11 with which it is desired to be associated.

For reasons which will be readily apparent from the description further below only the negative-going slope portions of trace 43 produce a stable positioning of transducer 10 at the point where they cross the zero axis 46. Thus, by further continuing the transverse movement of shutter assembly 28, traces 41 and 39 respectively reach a maximum and minimum and then recommence movement which will ultimately produce a differential amplifier output crossing the zero axis 46 at point 47. Point 47 has, however, been rendered unstable by the foregoing arbitrary convention, it being understood that a comparable system could be employed whereby the positive-going slopes would be rendered stable at the point of crossing the zero axis 46 while the negative-going slope portions of trace 43 would be rendered unstable at such times. With the foregoing arbitrarily chosen conventions, however, a negative-going differential amplifier output for trace 43 will become stable at points 44 and 48 for two adjacent recording tracks 11.

It will be further explained below that whenever trace 43 is negative (i.e., below the zero axis 46) the transducer will be moved in a direction serving to adjust the output of the differential amplifier 42 leftwardly (as shown in FIG. 3). When trace 43 is positive, transducer movement causes the output voltage to travel to the right (as shown in FIG. 3). Thus it should be clear that the zero axis crossing points 47 are unstable conditions while points 44, 48 are stable and represent "on track" positions.

Thus a negative differential amplifier output is connected to operate the transducer-positioning motor 49 to produce movement to shutter assembly 28 from right to left while a positive differential amplifier output causes motor 49 to produce shutter movement serving to move trace 43 from left to right (FIG. 3).

Briefly, as shown in general in FIG. 1, the output from differential amplifier 42 serves to operate a stepping switch arrangement 51 and feeds signals through to the motor drive amplifier 52 for directional control of motor 49. Motor 49 is in turn connected, as indicated by the dashed line 53, to directly and conjointly move shutter assembly 28 and transducer 10.

Stepping switch 51 can also be operated by providing a manual stepping as by means of a pushbutton 54 provided in the input line thereto or can be automatically controlled by means of an input pulse as represented by the pulse 56 arriving via a second input line and representing a stepping signal.

Each successive actuation of stepping switch 51 serves to register a count on a track counter 57 whereby the track position of transducer 10 can be identified.

In addition to the above, means have been provided, now shown in FIG. 1, whereby transducer 10 and shutter assembly 28 can conjointly be driven reversely to a home track position such as track 11a.

A detailed construction of stepping switch 51 has been shown in FIG. 4 for operation as now to be described. Photocells 23, 24 are respectively connected to provide inputs to the system via lines 58, 59. Thus differential amplifier 42 receives the inputs from each of the two photocells.

To compensate for minor errors in positioning the transducer as may be introduced by using differently recorded tapes, a potentiometer or other variable resistance 61, when coupled to a suitable voltage source, introduces a corrective input to the differential amplifier 42.

The output signal representations from differential amplifier 42 appear respectively on lines 62, 63. It is these outputs which are alternately operating 180 electrical degrees out of phase with each other as previously described. Means providing a predetermined degree of difference between these signal representations effects movement of the transducer in response to depression of manual switch 54 or receipt of a control pulse 56 on line 82 as described below.

The excursions of the signals on lines 62, 63 are limited and somewhat squared by a limiter 64 which produces oppositely going attenuated square waves 66, 67, having suitable finite rise and fall times. These square waves are fed through an OR-gate 68 whenever the output on line 77 is preconditioned positive. At such times the conjoint mixing of signals 66, 67 produces the pulse train 71 on the input line 72 to a one-shot multivibrator 73 which fires a positive output pulse on line 74 in response to the negative-going portion of pulses 71a, 71b of pulse train 71.

A flip-flop circuit 76 of conventional design is arranged whereby positive and negative stable states are alternately established on output leads 77, 78 in response to a "set" signal appearing at the "set" lead 79 and in response to a "reset" signal applied via lead 81.

Assuming that forward switch 94 has been closed and that a stepping pulse 56 has been received upon line 82, motor 49 will be operated in a manner whereby transducer 10 will be moved to the next forward (FIG. 3) position and centered accurately thereon. This function is accomplished by feeding the pulse 56 via line 82 and diode 83 poled to pass this positive pulse to the "set" lead 79 of flip-flop 76. This action serves to condition output lead 77 to its positive stable state whereby line 69, being positive, serves to pass pulse train 71 into the one-shot multivibrator 73. The next negative-going portion of a pulse 71a, 71b operates multivibrator 73 so as to condition line 74 positive thereby feeding a positive pulse via diode 84 to the rest lead 81 thereby reversing the state on leads 77, 78 and, accordingly, cutting off any further input to multivibrator 73.

During the time that flip-flop 76 was in its "set" state lead 78 was in a stable negative state. This stable negative condition on lead 78 serves to bias transistor 86 into conduction whereby the positive voltage at point 88 is carried by line 87 directly into one of the two input lines 89 operating motor drive amplifier 52. The voltage from point 88 is sufficient to swamp out any difference signals which are being supplied at that time and thus guarantees the operation of motor 49 in the direction responsive to a relatively large positive voltage on input line 89. During this time, of course, flip-flop 76 remains in that stable state whereby line 77 carries a stable positive voltage condition so as to permit the pulse train 71 from the photocells 23, 24 to be fed to one-shot multivibrator 73. Thus, as soon as shutter assembly 28 has moved to a point providing the next subsequent negative-going pulse 71a, 71b a reset signal will appear on line 74 for resetting flip-flop 76 via reset lead 81.

It is readily apparent that a succession of stepping pulses 56 can cause transducer 10 to step successively from one track to the next.

Manual means are provided for moving the transducer rapidly across a number of tracks as by means of depressing the manual button 54 which connects a positive voltage source from point 91 via line 92, diode 93 and thence to the "set" lead 79 of flip-flop 76. From this point operation of the system proceeds as described above, with the exception that each time flip-flop 76 is reset by virtue of pulses being provided from one-shot multivibrator 73 the flip-flop is again immediately "set" by continued depression of pushbutton 54.

It is to be observed that track counter 57, of conventional design such as an arrangement of cascaded flip-flops or other common electronic counting devices, responds to the output from multivibrator 73 each time it provides an output pulse for resetting flip-flop 76. This will be true, not only during manual operation resulting from depression of pushbutton 54 but also during control from electrical pulses 56.

A direction control switch 94, when thrown to the position shown in the drawing serves to operate motor 49 in a forward direction. However, upon transfer of the armature for switch 94 to the second position shown, the swamping pulse from point 88 will cause a reversal in the driving of motor 49, in conventional style, whereby transducer 10 will be moved reversely across tape 12.

Upon moving assembly 28 to its ultimate forwardmost position a forward limit switch 96 will be contacted by a portion of the moving assembly so as to be opened thereby to discontinue further driving of motor 49 in the forward direction, (other than to accurately center transducer 10 upon its track in response to the differential output from amplifier 42). Switch 96 is operated conjointly with the mechanical operation of a second forward limit switch 97. In practical application, these two switch points can obviously be coupled through a common member whereby the switches 96, 97, respectively, form first and second sections of an upper limit switch assembly.

By closing limit switch 97, the next subsequent arrival of a control pulse 56 serves to "set" a "go home" flip-flop 98 by application of the positive voltage to line 99. The setting of flip-flop 98 supplies a stable negative state to output lead 101 and a steady positive state to output lead 102 whereby the state on lead 101 biases transistor 103 into conduction whereby the voltage from point 88 is substantially directly coupled to input line 104 so that motor drive amplifier 52 serves to operate motor 49 in a reverse direction by swamping out all other differential signals arriving via lines 58, 59 from the photocells.

The positive stable state on lead 102 instantaneously serves to reset flip-flop 76 so as to condition its output lead 77 to a positive stable state coupled via line 77 to activate a one-shot multivibrator 73 for passing differential signals from amplifier 42. These signals, again, serve to reset flip-flop 76.

As assembly 28 moves in a reverse direction, ultimately a portion of the moving mechanism strikes a reverse limit switch having two sections 106, 107. Switch 106 is, or course, at that point opened so as to discontinue the connection from voltage point 88, and switch 107 is closed to apply a positive voltage from point 108 to the one-shot multivibrator 109 whereby a prolonged reset signal is supplied on line 110 to reset track counter 57.

From the foregoing it will be readily apparent that motor 49 will be driven to step transducer 10 from one track to the next and, upon arrival at a given track the aggregate light falling on each of two photocells from a number of spaced transmissive portions will be compared to provide a difference signal which serves to adjust the positioning of transducer 10 by controlling motor 49.

I claim:

1. In a positioning system of a type for registering a signal transducer with respect to each of a plurality of laterally adjacent record paths defined upon a record medium comprising means forming first and second light paths, light source means for projecting light along said paths, first and second photoresponsive means respectively disposed in each of said paths for providing electrical signal representations indicative of the level of light projected in their respective paths, first and second mask means having discrete, spaced transmissive portions respectively serving to subdivide the light projected in said paths, each of said photoresponsive means being disposed to be influenced by the aggregate light passing simultaneously via a large number of said transmissive portions of its associated mask means to provide its said signal representation, shutter means carried by said transducer for progressively increasing the light transmitted via one of said mask means relative to the light transmitted via the other of said mask means in response to movement of said transducer to provide relatively oppositely varying signal representations from said first and second photoresponsive means, and means conjointly responsive to changing differences in said signal representations changing in a predetermined electrical direction and to a net difference of predetermined polarity between the two signal representations of said first and second photoresponsive means to move and dispose the transducer with stability at said track positions.

2. A positioning system according to claim 1 further including means providing a predetermined degree of difference between said signal representations to effect movement of said transducer.

3. A positioning system according to claim 1 further including means serving to move said transducer by discrete steps in response to a predetermined degree of difference between said signal representations, and means for counting the steps taken by the transducer.

4. In a positioning system of a type for registering a positionable element with respect to each of a plurality of adjacent positions comprising means forming first and second light paths, light source means for projecting light along said paths, first and second photoresponsive means respectively disposed in each of said paths for providing electric signal representations indicative of the level of light projected in their respective paths, first and second mask means having discrete, spaced transmissive portions respectively serving to subdivide the light projected in said paths, each of said photoresponsive means being disposed to be influenced by the aggregate light passing simultaneously via a large number of said transmissive portions of its associated mask means to provide its said signal representation, shutter means carried by said positionable element for progressively increasing the light transmitted via one of said mask means relative to the light transmitted via the other of said mask means in response to movement of said element to provide relatively oppositely varying signal representations from said first and second photoresponsive means, and means responsive to alternately occurring minimum differences between the signal representations of said first and second photoresponsive means developed during continued relative movement between said first and second mask means and to those differences of a predetermined polarity between said signal representations of said first and second photoresponsive means to move and register said positionable element with stability centrally of one of said positions.

5. A positioning system according to claim 1 wherein said light source means comprises a single light source common to both of said light paths.

* * * * *